United States Patent
Elangovan

(10) Patent No.: US 10,139,914 B2
(45) Date of Patent: Nov. 27, 2018

(54) METHODS AND APPARATUS FOR USING THE HUMAN BODY AS AN INPUT DEVICE

(71) Applicant: Nod, Inc., Santa Clara, CA (US)

(72) Inventor: Anusankar Elangovan, San Francisco, CA (US)

(73) Assignee: Nod, Inc., Santa Clara, CA (US)

(*) Notice: Subject to any disclaimer, the term of this patent is extended or adjusted under 35 U.S.C. 154(b) by 0 days.

(21) Appl. No.: 14/487,039

(22) Filed: Sep. 15, 2014

(65) Prior Publication Data

US 2015/0077336 A1    Mar. 19, 2015

Related U.S. Application Data

(60) Provisional application No. 61/877,933, filed on Sep. 13, 2013.

(51) Int. Cl.
G06F 3/01 (2006.01)
G06F 3/0481 (2013.01)
G06F 3/0354 (2013.01)

(52) U.S. Cl.
CPC .............. G06F 3/017 (2013.01); G06F 3/011 (2013.01); G06F 3/014 (2013.01); G06F 3/03545 (2013.01); G06F 3/04815 (2013.01); G06F 2203/0331 (2013.01)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| | | | | |
|---|---|---|---|---|
| 6,515,669 B1* | 2/2003 | Mohri | ..................... | G06F 3/014 345/418 |
| 9,782,648 B2* | 10/2017 | DeCarlo | ................. | A63B 69/00 |
| 9,910,498 B2* | 3/2018 | Kutliroff | .................. | G06F 3/017 |
| 2006/0129070 A1* | 6/2006 | Pearl | .................... | A61B 5/0057 600/595 |
| 2006/0161363 A1* | 7/2006 | Shibasaki | ................ | A61B 5/11 702/94 |
| 2007/0263001 A1* | 11/2007 | Trzecieski | .............. | G06F 3/011 345/473 |
| 2008/0031512 A1* | 2/2008 | Mundermann | .... | G06K 9/00342 382/154 |
| 2008/0091373 A1* | 4/2008 | McGibbon | ........... | A61B 5/1121 702/95 |
| 2010/0164862 A1* | 7/2010 | Sullivan | ............... | G06K 9/3216 345/156 |
| 2011/0213664 A1 | 9/2011 | Osterhout et al. | | |

(Continued)

FOREIGN PATENT DOCUMENTS

WO    2012/099584    7/2012

OTHER PUBLICATIONS

International Search Report and Written Opinion dated Dec. 8, 2014 in corresponding PCT/US2014/055708.

*Primary Examiner* — William Lu
(74) *Attorney, Agent, or Firm* — Pillsbury Winthrop Shaw Pittman LLP

(57) ABSTRACT

Described are apparatus and methods for reconstructing a full human skeletal pose or a partial skeletal pose by aggregating and fusing various data from various sensors, and for detecting the occurrence of gestures from poses that occur over a period of time.

46 Claims, 12 Drawing Sheets

(56) References Cited

U.S. PATENT DOCUMENTS

| | | | |
|---|---|---|---|
| 2011/0298827 A1 | 12/2011 | Perez | |
| 2012/0019373 A1* | 1/2012 | Kruse | G06F 3/014 340/407.2 |
| 2012/0093320 A1* | 4/2012 | Flaks | A63F 13/10 381/17 |
| 2012/0194645 A1* | 8/2012 | Fuller | G06T 13/40 348/46 |
| 2012/0212484 A1 | 8/2012 | Haddick et al. | |
| 2012/0249590 A1* | 10/2012 | Maciocci | G06F 3/011 345/633 |
| 2012/0319940 A1 | 12/2012 | Bress et al. | |
| 2012/0327194 A1* | 12/2012 | Shiratori | G06F 3/011 348/47 |
| 2014/0055352 A1* | 2/2014 | Davis | G06F 3/017 345/156 |
| 2014/0098018 A1* | 4/2014 | Kim | G06F 3/014 345/156 |
| 2014/0139422 A1* | 5/2014 | Mistry | G06F 3/014 345/156 |
| 2014/0282274 A1* | 9/2014 | Everitt | G06F 3/017 715/863 |
| 2014/0282275 A1* | 9/2014 | Everitt | G06F 3/017 715/863 |
| 2014/0358475 A1* | 12/2014 | Boulkenafed | G01B 21/16 702/152 |
| 2015/0077336 A1* | 3/2015 | Elangovan | G06F 3/011 345/156 |
| 2015/0084840 A1 | 3/2015 | Kim | |

\* cited by examiner

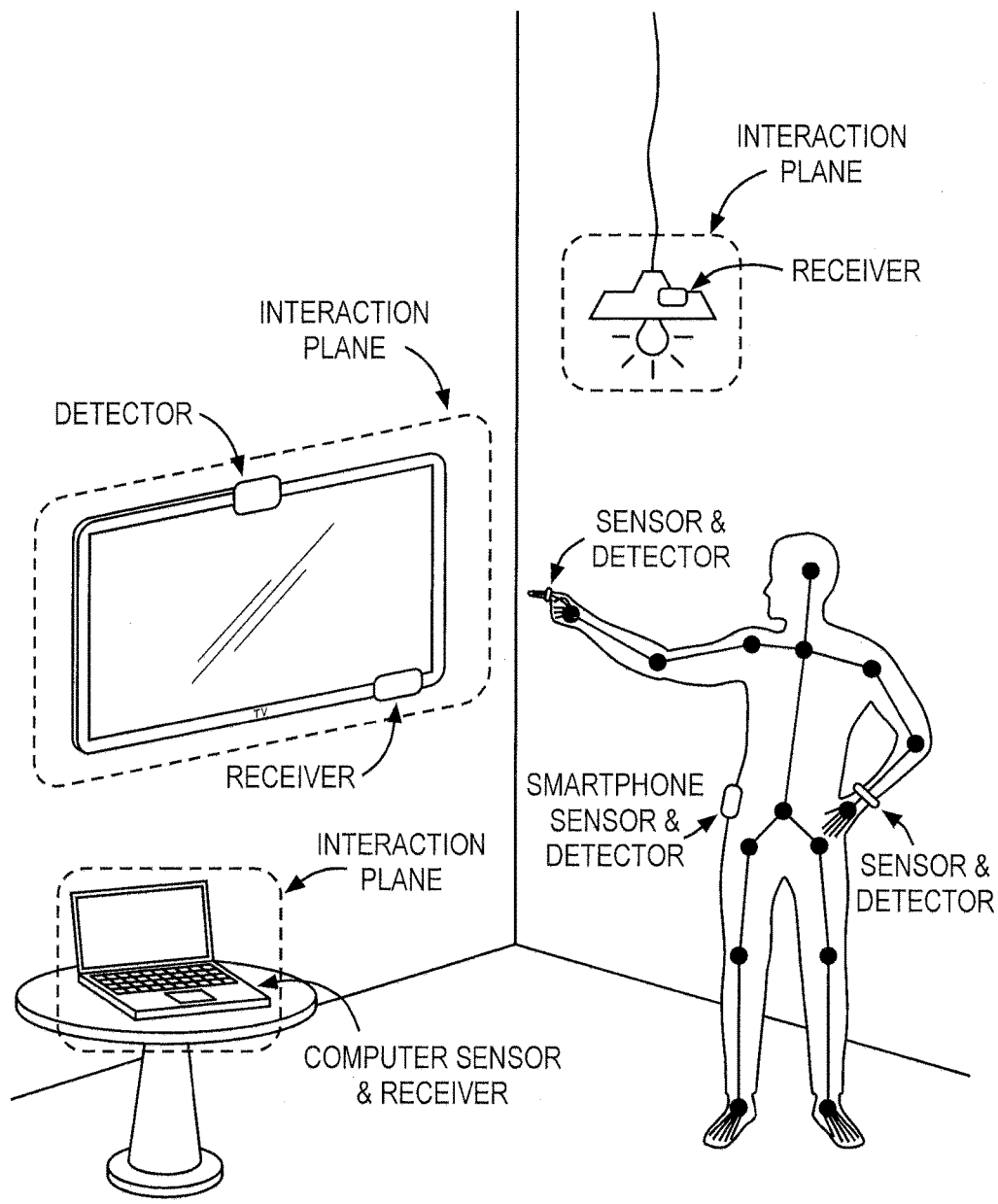
FIG. 1(B)1

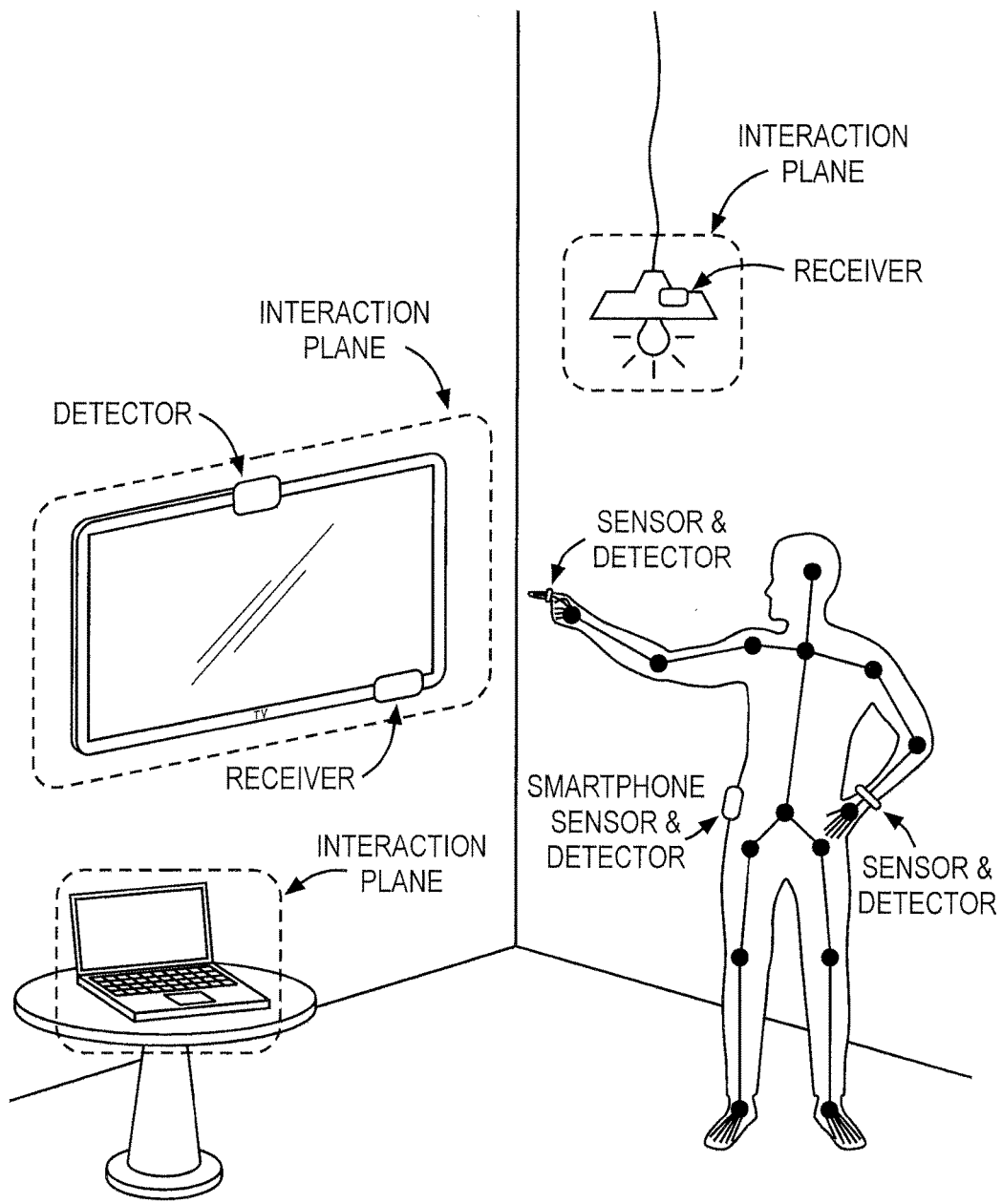
FIG. 1(B)2

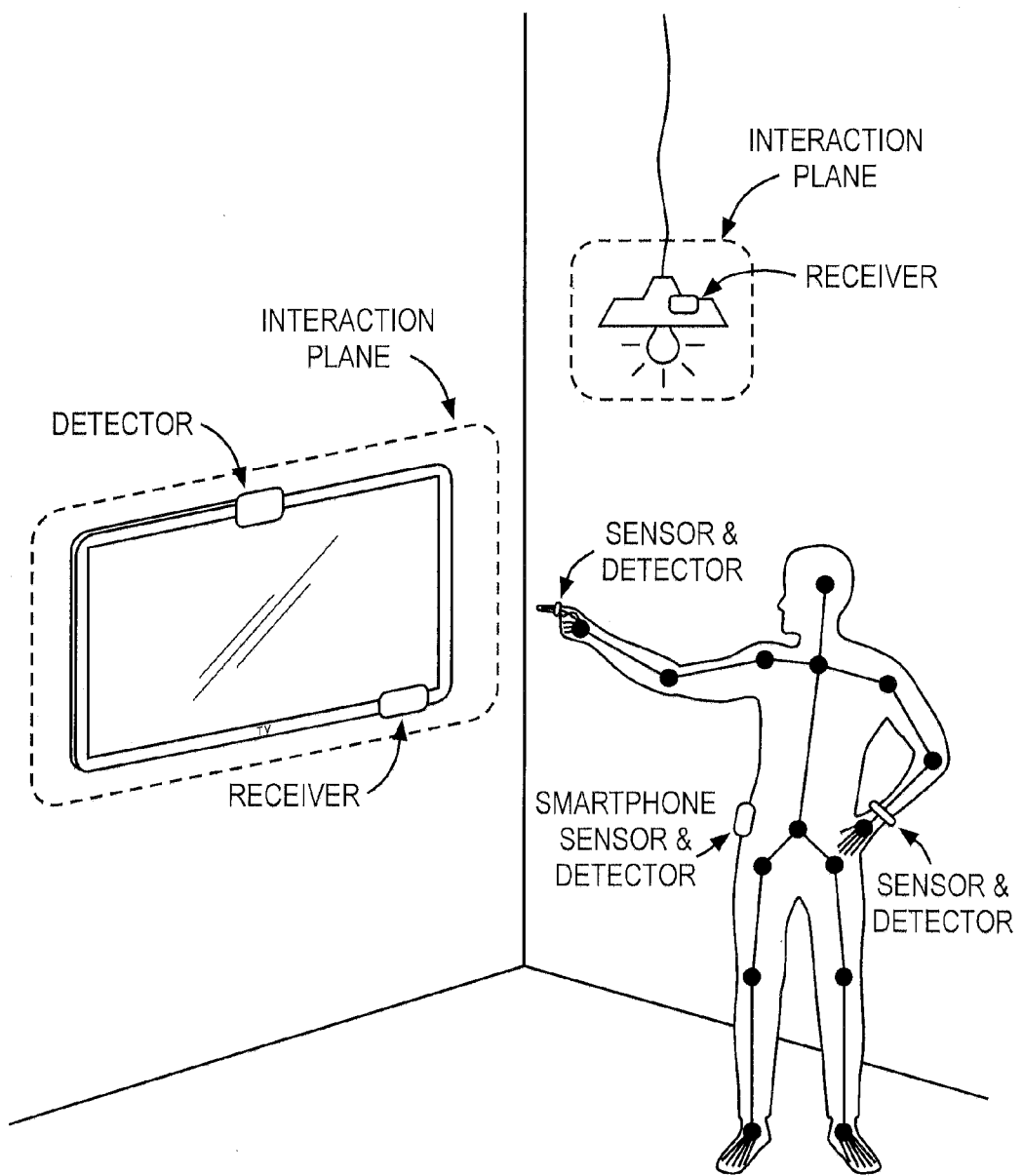
FIG. 1(B)3

METHODS AND APPARATUS FOR USING THE HUMAN BODY AS AN INPUT DEVICE

RELATED APPLICATIONS

This application claims the benefit of U.S. Provisional Patent Application Ser. No. 61/877,933 filed Sep. 13, 2013, and is hereby incorporated by reference.

FIELD OF THE ART

This disclosure relates to using the human body as an input mechanism.

BACKGROUND

Many conventional positional depth sensors use camera-based 3D technology and the associated post-processing required in such conventional depth sensing technologies can be substantial. Such technologies, while adequate for certain purposes, have problems, including field-of-view issues, occlusion and poor performance in outdoor and brightly light areas.

SUMMARY

Described are apparatus and methods for reconstructing a full human skeletal pose or a partial skeletal pose by aggregating and fusing various data from various sensors, and for detecting the occurrence of gestures from poses that occur over a period of time.

In one embodiment is described an apparatus capable of interacting with at least one controllable device based upon a pose of at least a portion of a human body, the apparatus comprising: one or more sensors that are sized for wearing on the human body, each of the one or more sensors emitting sensor data; and a detection unit that operates upon the sensor data to determine the pose of at least the portion of the human body and is capable of interacting with the at least one controllable device, the detection unit including: a memory that stores at least one or more characteristics of human anatomy that are associated with the human body using at least a partial skeletal rendering of a human; and a detection processor, automatically operating under software control, that inputs, aggregates and fuses the sensor data from each of the one or more sensors using the at least one or more characteristics of human anatomy stored in the memory to determine the pose of at least the portion of the human body based upon a locality of said one or more sensors; wherein at least some of the one or more sensors and the detection unit are packaged in an integrated mechanical assembly.

In a particular aspect, the detection unit wirelessly outputs a plurality of poses as pose data during a period of time; and further comprising: an aggregator unit that wirelessly inputs the pose data to determine a gesture associated therewith and is capable of interacting with the at least one controllable device, the aggregator unit including: an aggregator memory that stores at least one or more characteristics of human anatomy that are associated with the human body; and an aggregator processor, automatically operating under software control, that inputs and operates upon the pose data using the at least one or more characteristics of human anatomy stored in the aggregator memory to determine the gesture.

In another embodiment is described an apparatus capable of interacting with at least one controllable device based upon a pose of at least a portion of a human body, the apparatus comprising: a plurality of sensors that are sized for wearing on the human body, each of the one or more sensors emitting sensor data; a plurality of detection units that each inputs sensor data from a plurality of sensors associated therewith and aggregates the input sensor data into aggregated data; an aggregator unit that wirelessly inputs aggregated data from each of the plurality of detection units, the aggregator unit including: an aggregator memory that stores at least one or more characteristics of human anatomy that are associated with the human body using at least a partial skeletal rendering of a human; and an aggregator processor, automatically operating under software control, that further aggregates and fuses the aggregated data from each of the plurality of detection units using the at least one or more characteristics of human anatomy stored in the aggregator memory to determine the pose of at least the portion of the human body based upon a locality of said plurality of sensors.

In a further embodiment is described a method for interacting with at least one controllable device based upon a pose of at least a portion of a human body, the method comprising: sensing, using one or more sensors that are sized for wearing on the human body, sensor data from each of the one or more sensors; and determining the pose of at least the portion of the human body based upon the sensor data, under processor and software control, the step of determining operating to: associate at least one or more characteristics of human anatomy with the human body using at least a partial skeletal rendering of a human; and automatically determine, under the processor and software control, the pose of at least the portion of the human body based upon a locality of said one or more sensors, the step of automatically determining including inputting, aggregating and fusing the sensor data from each of the one or more sensors using the at least one or more characteristics of human anatomy to determine the pose, wherein the at least one or more characteristics of human anatomy that are associated with the human body that are stored in the memory include at least one of (a) a range of motion of human skeletal joints and (b) limitations in the speed human bones can move relative to each other.

BRIEF DESCRIPTION OF THE DRAWINGS

FIG. 1(B)1 illustrates a system diagram according to an embodiment.

FIG. 1(B)2 illustrates a system diagram according to another embodiments.

FIG. 1(B)3 illustrates system diagram according to a further embodiment.

FIG. 2 illustrates that the system allows for the sensor 3 to be used for one gesture one pointing to a light (1) as shown in FIG. 2, and another gesture when pointing at the computer (2) as shown.

FIGS. 3, 4, and 5 show embodiments for micro-gesture recognition according to the embodiments.

DETAILED DESCRIPTION OF THE PREFERRED EMBODIMENTS

Figure 1A:
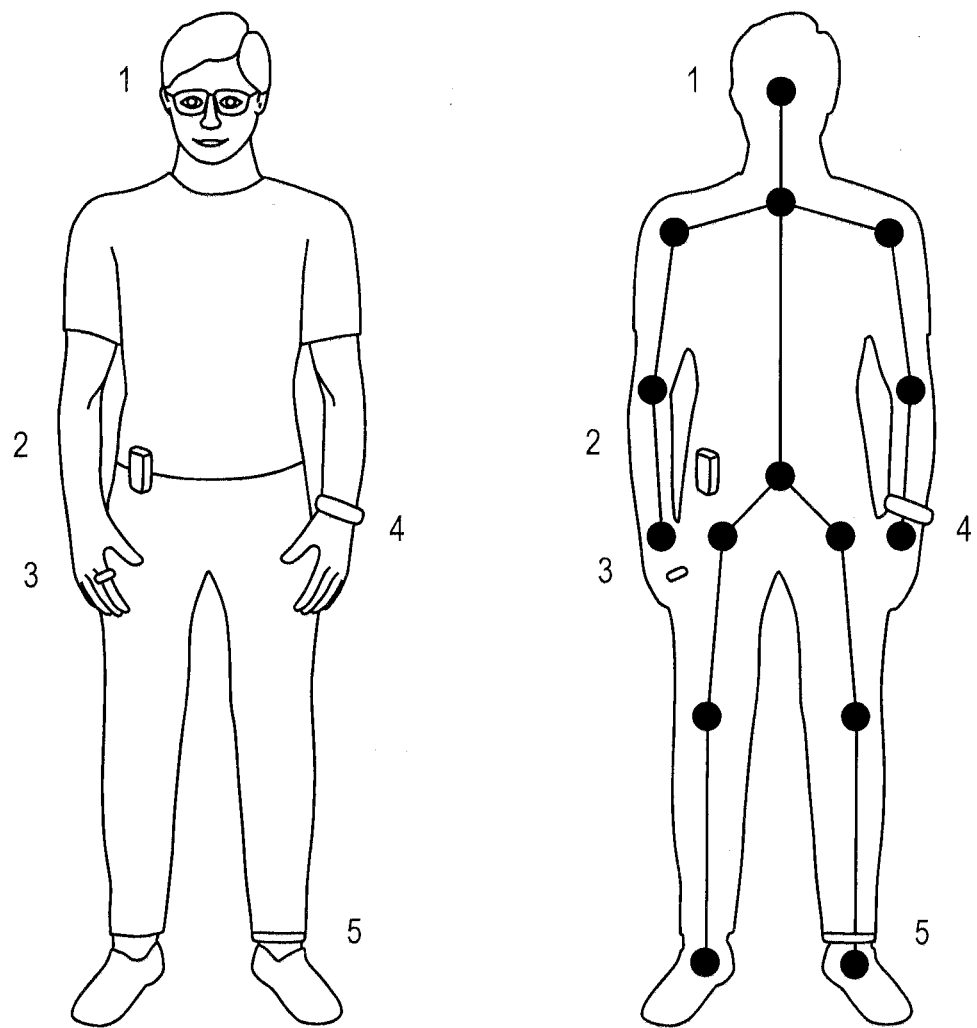
FIG. 1(A) illustrates the skeletal rendering of the human with various nodes, and the usage of many different sensors according to the embodiments.

Various devices such as computers, televisions, electronic devices and portable handheld devices can be controlled by input devices such as a computer mouse or keyboard. The Human skeleton is able to take on various forms and shapes. Various sensors such as accelerometers, gyroscopes, compasses and cameras can be collectively used (all from a substantially single point such as if disposed on a single ring; or from multiple different locations) to estimate and or derive the pose of the human skeleton. These sensors dynamically provide data for varying periods of time when located in the associated space for sensing, and preferably stop or go into a low power mode when not in the associated space. When sensor data is unavailable, various calculations may be employed to reconstruct the skeletal pose without all the sensor data.

Various poses and gestures of the human skeleton over a period of time can be aggregated to derive information that is interpreted (either at the sensor or at the device) and communicated over wireless channels such as Bluetooth or Infrared to control various devices such as computers, televisions, portable devices and other electronic devices, as described further herein.

Described are apparatus and methods for reconstructing a full human skeletal pose or a partial skeletal pose by aggregating and fusing various data from various sensors. As is apparent from the descriptions provided herein, "aggregate" is used to mean to collect or accumulate unprocessed data, while "fuse" means is used to mean to process or filter data from one or more sensors to obtain a pose estimate. These sensors can be on the human body or in the immediate environment such as a 3D depth sensor attached to a computer or television.

In a preferred embodiment, MEMS sensors, and preferably a plurality of them within a substantially single location such as on a ring are used. MEMS sensors provide the advantage of not requiring a separate detector compared to conventional camera based depth sensors. A plurality of MEMS sensors can be used to obtain more information than would be possible with a single such sensor, as described herein. When further used in combination with accelerometers, gyroscopes, compasses, the data from the various sensors can be fused and interpreted to allow for sensing of micro-gestures, as described herein.

Such a single sensor can be integrated into everyday objects such as clothing, jewelry and wearable devices like fitness monitors in order to use of the human body as a real-time input device that can interact with a machine in its surroundings.

Processing of all the data generated to accurately detect the pose of the human body in real-time includes engineering desiderata of event stream interpretation and device power management, as well as usage of algorithms such as Kalman filtering and complementary filters used to "fuse" the sensor data into coherent pose estimates. The filtering algorithms used are based on the locality of the sensor and they factor in the human anatomy and the joint angles of the bones the sensors are tracking. The fused data is then processed to extract "micro-gestures"—which herein means small movements in the human body which could signal an intent. These micro-gestures could be something as simple as a blink of an eye or a snap of the fingers. The human body can generate thousands of such potentially intentional gestures. Extracting only meaningful information is what the innovation provides for herein.

Gestures such as waving your arm from one side to another or micro-gestures such as swiping your index finger from one side to another are mapped to functions, such as changing channels on a TV or advancing the song being played. More complex gestures, such as interacting with the User Interface of a tablet computer are also possible using micro-gestural primitives to generate a more complex macro intent that machines in the environment can understand.

Another aspect is to decouple the display, computation, and input involved in gesture-based systems. This allows moving all or much of the computation to the cloud, achieving display independence and moving the input interface closer to the human body. Computing in the cloud provides elasticity to scale out computing as required, while display independence allows use of any screen in the surroundings, and the human body turns into a ubiquitous input device. The human skeletal structure is usually in constant motion generating very large amounts of possible gestures.

As mentioned, certain embodiments include one or more methods of aggregating and fusing various poses of the human skeletal to extract meaningful information to be transmitted to various computing devices.

An aspect of the system includes assembling various gestures that could be used to indicate a more complex gesture. These gestures take on various meanings depending on which device it is communicating with. In this method pointing to a Television and moving your hand from one direction to another can imply changing the channel while a similar such gesture could imply changing the light intensity when done pointing to a light bulb, with each of the Television and the light bulb being separate subspaces that are detected as such by an overall detector, for example.

Efficient power management strategy is also provided, such that the sensor device doesn't require a power on or power off switch. This involves determining the current state of gestural detection and further includes the ability to turn off components such as the gestural detection unit, or various sensors to save power.

Methods of interacting with various devices in ergonomically effective and humanly natural ways are possible due to the system as described. The method includes ways of interacting with devices without subjecting the user to motion that could cause repetitive stress injuries since the user is able to interact using natural body poses.

Sensors can be made to allow interacting with various devices by pointing to the device. This includes associating with a device being pointed to using compass data and radio signal strength, for example, as well as various other data.

Also provided for is providing context sensitive haptic feedback. This includes deducing what the user could have intended and provides appropriate haptic feedback. e.g the users finger could be subject to a force proportional to a visual animation on a display device such as pulling on an elastic rope.

Figure 2:
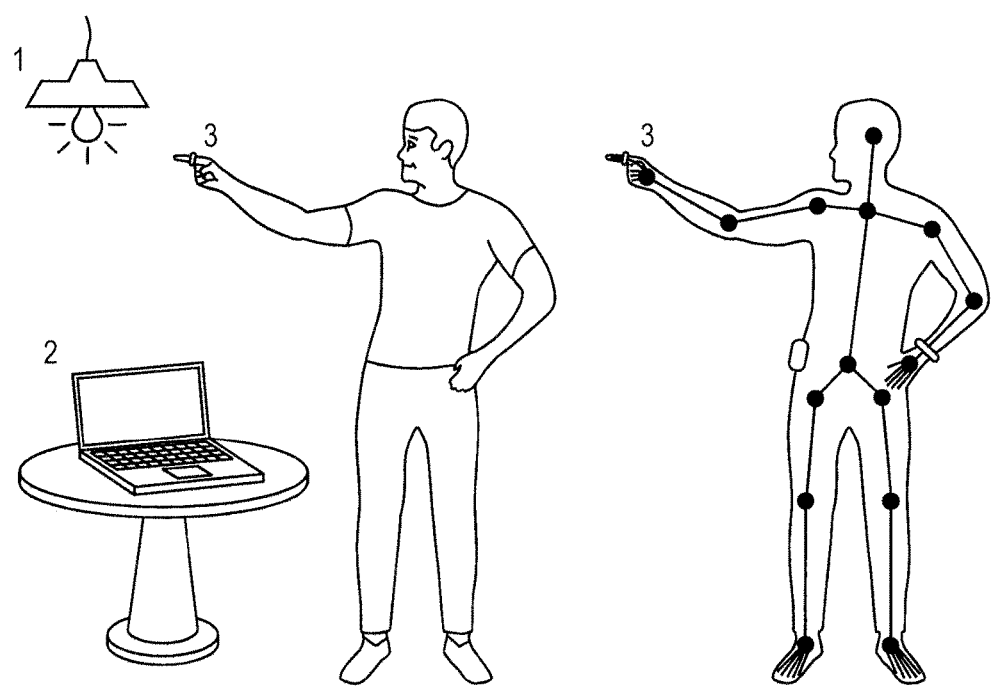
Figure 3:
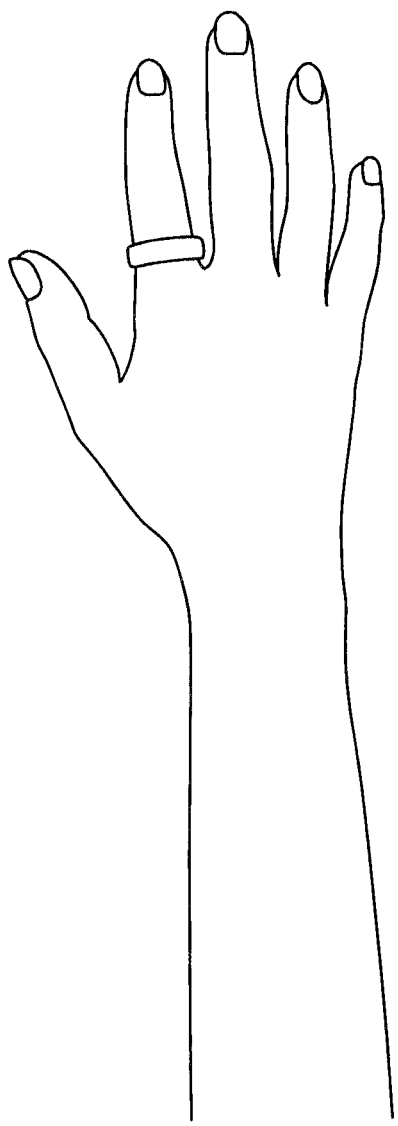

These various aspects are shown in the diagrams attached. FIG. 1(A) illustrates the skeletal rendering of the human with various nodes, and the usage of many different sensors: one on the glasses (1), another on the belt (2), a third of a number of different sensors for fingers (3), one for the belt (4) and one on an ankle bracelet or attached to the bottom of the pants worn (5). FIGS. 1(B)(1-3) shows a similar space and rendering, and points out specific subspaces associated with different objects; each of which can have their own relative coordinate system if needed. As shown, FIG. 1(B)1 illustrates a system diagram with a laptop as a third controllable device, which laptop includes an interaction plane and is labeled as Computer Sensor & Receiver to illustrate that it can operate the software needed to aggregate and fuse different sensor data together, as described elsewhere herein. FIG. 1(B)2 illustrates a system diagram with a laptop as well, but this laptop shown only as having an interaction plane, and operates in a distributed system (such as with cloud processing). FIG. 1(B)3 illustrates an even simpler system, which does not include the laptop at all within it. As is apparent, many different combinations are possible and within the contemplated scope herein.

As described above, the system allows for the sensor 3 to be used for one gesture one pointing to a light (1) as shown in FIG. 2, and another gesture when pointing at the computer (2) as shown.

Figure 4:
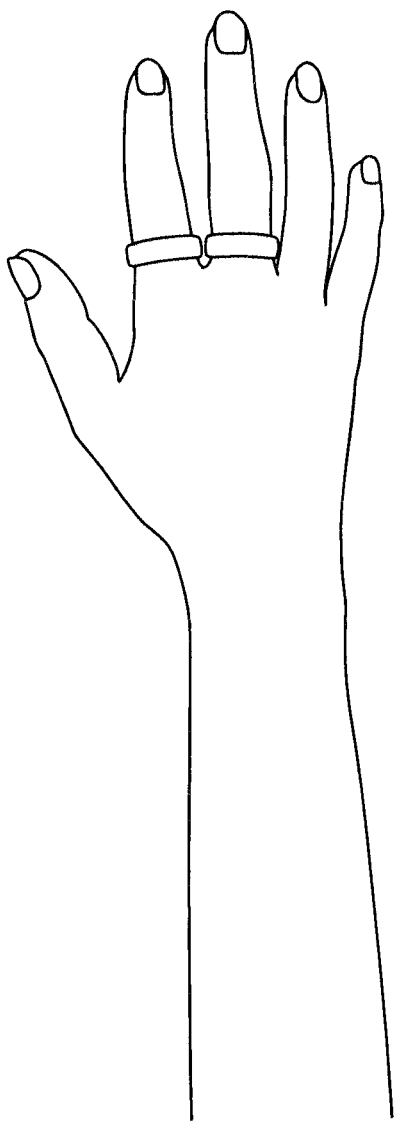
Figure 5:
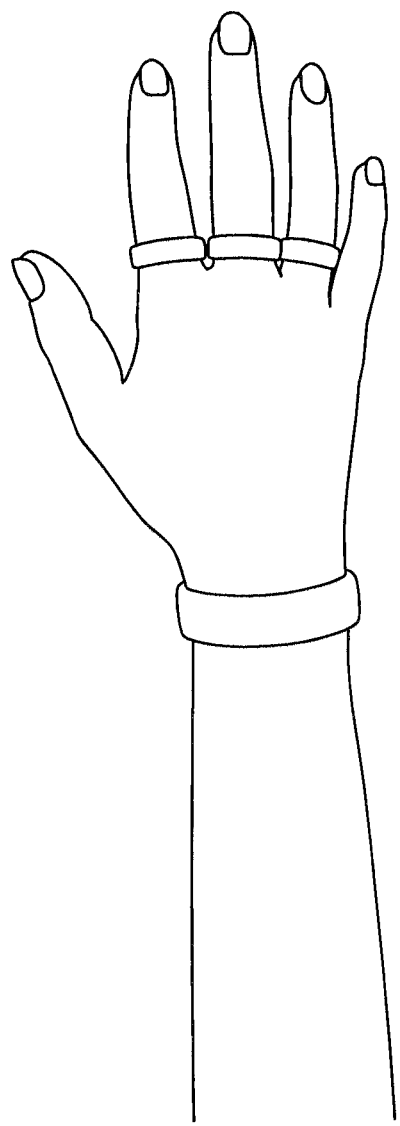

FIGS. 3, 4, and 5 show embodiments for micro-gesture recognition that include usage of 1, 2 and 3 finger rings, respectively, as shown. Other configurations are possible and within the intended scope herein.

Figure 6:
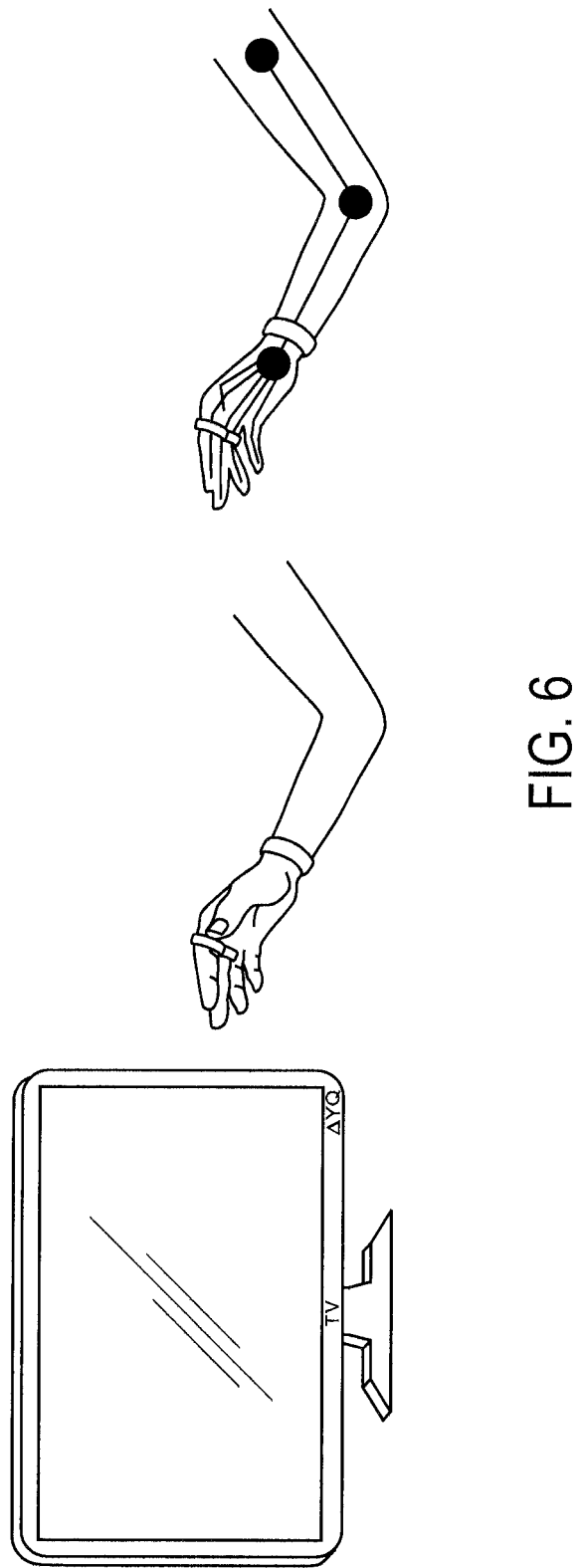
FIG. 6 shows an illustration of micro-gestures detected within a subspace that has its own relative coordinate system.

FIG. 6 shows an illustration of micro-gestures that are detected within a subspace around a computer, which subspace can have its own relative coordinate system, rather than being based upon absolute coordinates. In addition to the MEMS sensors in each ring, acceleration can also be used to detect distance from a relative reference point, such as the screen of the computer.

Figure 7:
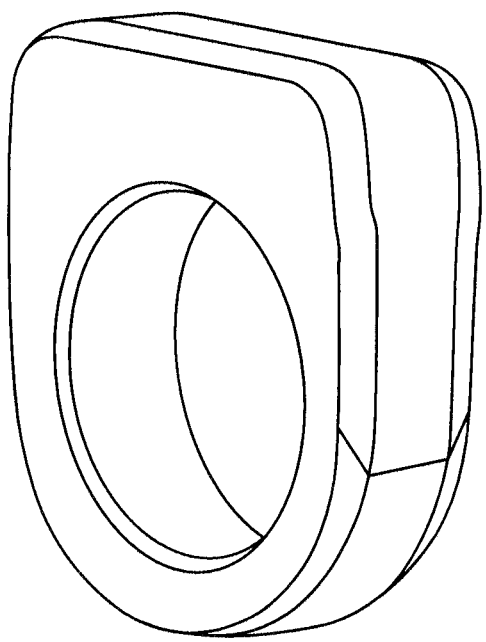
FIG. 7 illustrates a 3D exterior view of a single ring sensor.
Figure 8:
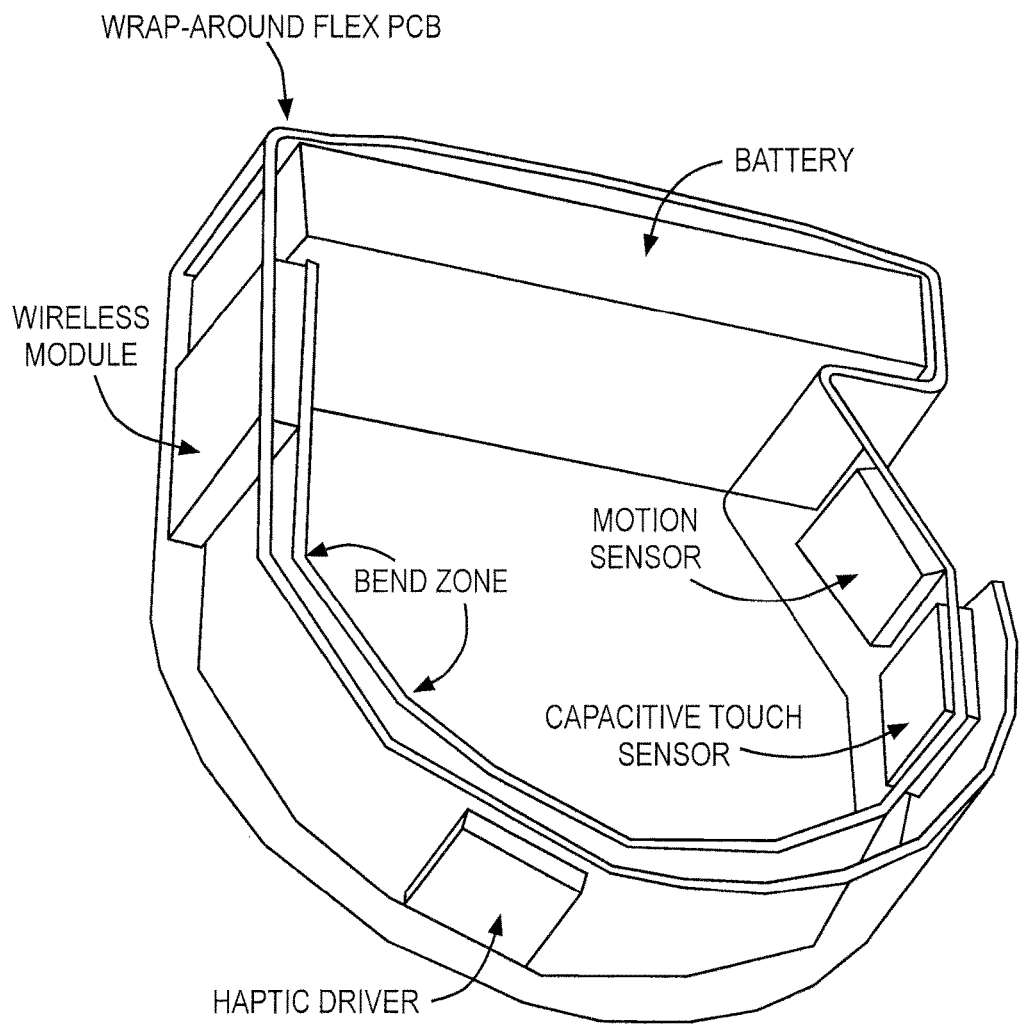
FIG. 8 illustrates a more detailed view of the ring sensor of FIG. 7.

FIG. 7 illustrates a 3D exterior view of a single ring sensor, and FIG. 8 illustrates that ring sensor in a more detailed view, with the significant electronic components identified, and which are connected together electrically as a system using a processor, memory, software as described herein, including other conventional components, for controlling the same. The processor controls the different sensors on the ring device and is in charge of detecting activity in the various sensors, fusing the data in them and sending such data (preferably fused, but in other embodiments not) to other aggregators for further processing. While shown as a ring sensor, this combination of elements can also be used for the other sensors shown in FIG. 1—though other combinations can also be used.

Figure 9:
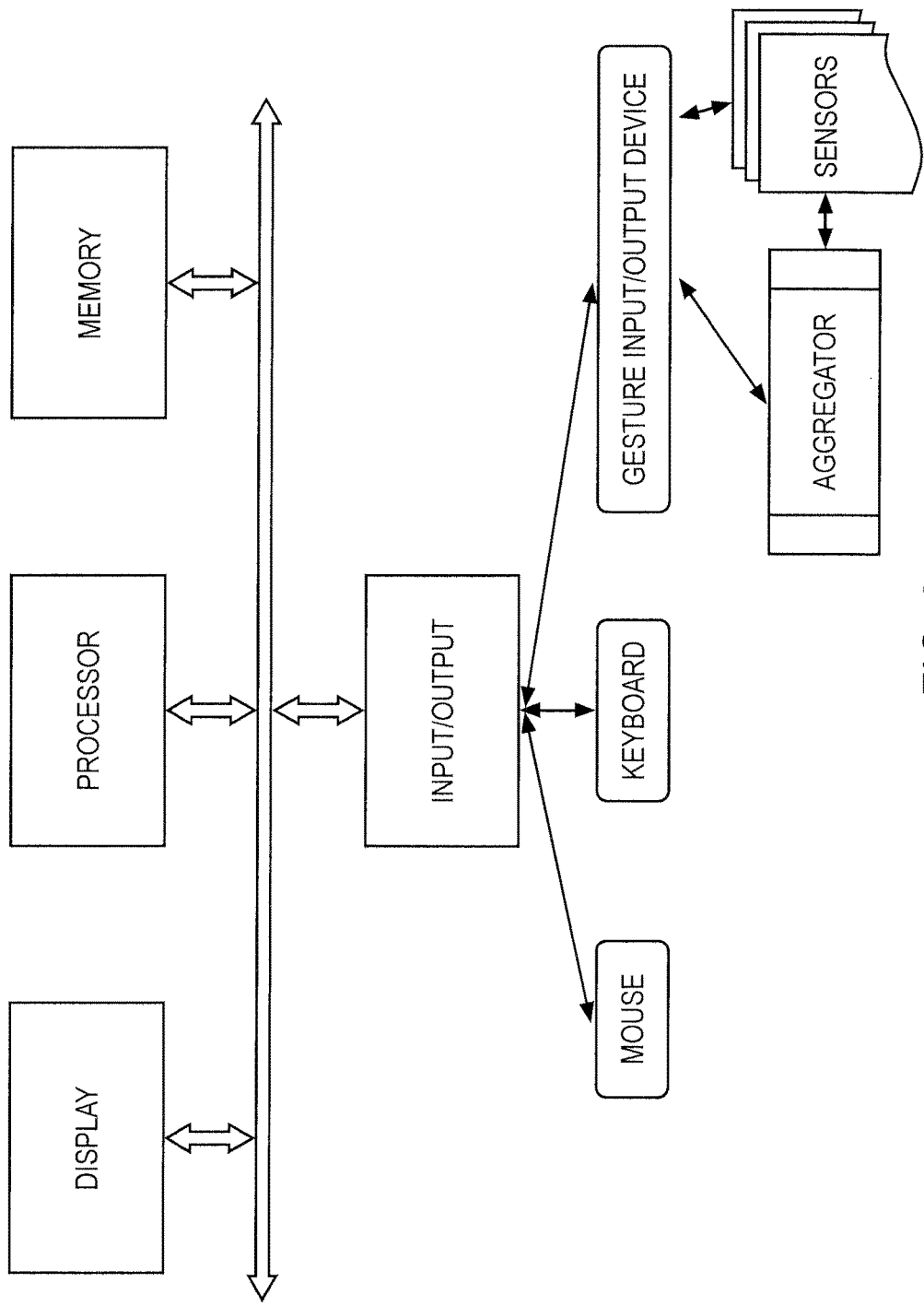
FIG. 9 illustrates a computer sensor & receiver according to the embodiments.

FIG. 9 illustrates a Computer Sensor & Receiver as shown in FIG. 1(B1). As illustrated in FIG. 9, included is a processor, memory and display that are used as is conventionally known. The processor controls the different sensors on the various devices and can fuse the data from disparate devices that has been aggregated and fused previously or not, and send such data (preferably fused, but in other embodiments not) to other aggregators for further processing as well as send control signals based on the what has been detected to control devices such as the light or television as shown in FIG. 1. I/O devices as known are also included, as well as what is labeled a Gesture Input/Output Device and an Aggregator coupled thereto (which Aggregator may be part of the Computer Sensor and Receiver or could be located elsewhere, such as on a wrist sensor as described above). The Aggregator can be implemented in hardware or software to process the various streams of data being received from the various sensors. The Aggregator factors in location of the sensor (e.g: on the finger or wrist etc.) and calculates what data is relevant from this sensor. This is then passed on to the Gesture Input/Output Device (which could also reside across a wireless link) to control various computing devices.

The device that could be worn on the ring could possess a Capacitive Touch surface on the exterior of the device (preferably the entire exterior surface) and a Capacitive Touch detector enclosed in the inside the device. The device can possess a haptic actuator and associated circuitry to be able to provide a haptic feedback based on user engagement with a computing device. The device can also support various forms of wireless networking such as NFC, Bluetooth and/or WiFi to be able to interact with various other devices in its surroundings.

Multiple sensors can interact with each other providing a stream of individually sensed data. For example a sensor worn on the ring can communicate with a wrist worn device or a smartphone in the pocket. This data could then be aggregated on the smartphone or wrist worn device factoring in the human anatomy. This aggregation may factor in range of motion of the human skeletal joints, possible limitations in the speed human bones could move relative to each other, and the like. These factors, when processed along with other factors such as compass readings, accelerometer and gyroscope data, can produce very accurate recognition of gestures that can be used to interact with various computing devices nearby.

Although the present inventions are described with respect to certain preferred embodiments, modifications thereto will be apparent to those skilled in the art.

What is claimed is:

1. An apparatus capable of interacting with at least one controllable device based upon a pose of at least a portion of a human body disposed within a space, the apparatus comprising:

one or more sensors that are sized for wearing on the human body, each of the one or more sensors emitting sensor data; and a detection unit that operates upon the sensor data to determine the pose of at least the portion of the human body and is capable of interacting with the at least one controllable device, wherein the detection unit operates upon the sensor data from the at least some of the one or more sensors using a relative coordinate system, the detection unit including:

a memory that stores at least one or more characteristics of human anatomy that are associated with the human body using at least a partial skeletal rendering of a human; and a detection processor, automatically operating under software control, that inputs, aggregates and fuses the sensor data from each of the one or more sensors using the at least one or more characteristics of human anatomy stored in the memory to determine the pose of at least the portion of the human body based upon a locality of said one or more sensors;

wherein at least some of the one or more sensors and the detection unit are packaged in an integrated mechanical assembly, wherein the integrated mechanical assembly is sized for wearing on the portion of the human body whose pose is being determined, wherein there are a plurality of integrated mechanical assemblies, with each of the plurality of the integrated mechanical assemblies including one or more sensors and a detection unit, wherein each of the plurality of integrated mechanical assemblies are configured to operate with its own relative coordinate system within a particular sub-space of the space and not based upon absolute coordinates of the space and sized for wearing on the human body, and wherein at least two of the plurality of same mechanical assemblies is each formed as a ring wearable on a human finger.

2. The apparatus according to claim 1 wherein the relative coordinate system includes a determination of distance from a relative reference point based upon sensor data obtained from the at least some of the one or more sensors.

3. The apparatus according to claim 1 wherein the at least one or more characteristics of human anatomy that are associated with the human body that are stored in the memory include at least one of (a) a range of motion of human skeletal joints and (b) limitations in the speed human bones can move relative to each other.

4. The apparatus according to claim 3 wherein the at least one or more characteristics of human anatomy that are associated with the human body that are stored in the memory include (a) a range of motion of human skeletal joints and (b) limitations in the speed human bones can move relative to each other.

5. The apparatus according to claim 1 wherein the detection unit interacts with the at least one controllable device and wherein the detection processor directs a command signal based on the pose to the at least one controllable device.

6. The apparatus according to claim 5 wherein the detection unit interacts with a plurality of controllable devices and is associated with only one of the plurality of controllable devices during a given period and wherein the detection processor directs a command signal based on the pose to a single one of the plurality of controllable devices during the given period.

7. The apparatus according to claim 6 wherein the association with the only one of the plurality of controllable devices during the given period is established based on the detecting unit detecting that a portion of the anatomy is pointing to the controllable device said detecting based on sensor data including at least one of compass data.

8. The apparatus according to claim 1 wherein the detection unit determines the occurrence of a gesture based on a plurality of said poses determined over a period of time.

9. The apparatus according to claim 8, wherein the detection processor, automatically operating under the software control, directs a command signal based on the gesture to at least one of the plurality of controllable devices.

10. The apparatus according to claim 1 wherein the integrated mechanical assembly is sized for wearing on the human body and wherein the one or more sensors include a plurality of sensors, the plurality of sensors including at least two of:
   a capacitive touch surface for detecting a capacitive touch;
   an accelerometer;
   a gyroscope; and
   a compass.

11. The apparatus according to claim 10 wherein the detection unit further includes a haptic feedback circuit for providing haptic feedback upon receipt of a context signal.

12. The apparatus according to claim 1 wherein the integrated mechanical assembly is sized for wearing on the human body and wherein the one or more sensors include a plurality of sensors, the plurality of sensors including:
   a capacitive touch surface for detecting a capacitive touch;
   an accelerometer;
   a gyroscope; and
   a compass.

13. The apparatus according to claim 1 wherein the detection unit further includes a haptic feedback circuit for providing haptic feedback upon receipt of a context signal.

14. The apparatus according to claim 1 wherein the integrated mechanical assembly is sized for wearing on the human body and the detection unit wirelessly outputs a plurality of poses as pose data during a period of time; and further comprising:
   an aggregator unit that wirelessly inputs the pose data to determine a gesture associated therewith and is capable of interacting with the at least one controllable device, the aggregator unit including:
      an aggregator memory that stores at least one or more characteristics of human anatomy that are associated with the human body; and
      an aggregator processor, automatically operating under software control, that inputs and operates upon the pose data using the at least one or more characteristics of human anatomy stored in the aggregator memory to determine the gesture.

15. The apparatus according to claim 14 wherein there are a plurality of the integrated mechanical assemblies, with each of the plurality of the integrated mechanical assemblies sized for wearing on the human body and including one or more sensors and a detection unit, and each integrated mechanical assembly wirelessly outputting an associated plurality of poses as pose data during the period of time.

16. The apparatus according to claim 15 wherein the at least one or more characteristics of human anatomy that are associated with the human body that are stored in the aggregator memory include at least one of (a) a range of motion of human skeletal joints and (b) limitations in the speed human bones can move relative to each other.

17. The apparatus according to claim 15 wherein the at least one or more characteristics of human anatomy that are associated with the human body that are stored in the aggregator memory include (a) a range of motion of human skeletal joints and (b) limitations in the speed human bones can move relative to each other.

18. The apparatus according to claim 14 wherein the aggregator unit interacts with the at least one controllable device and wherein the aggregator processor directs a command signal based on the gesture to the at least one controllable device using a different communication protocol than used for communicating the pose data between the detection unit and the aggregation unit.

19. The apparatus according to claim 18 wherein the aggregator unit interacts with a plurality of controllable devices and is associated with only one of the plurality of controllable devices during a given period and wherein the aggregator processor directs a command signal based on the gesture to a single one of the plurality of controllable devices during the given period using a different communication protocol than used for communicating the pose data between the detection unit and the aggregation unit.

20. The apparatus according to claim 18 wherein the association with the only one of the plurality of controllable devices during the given period is established based on the detecting unit detecting that a portion of the anatomy is pointing to the controllable device said detecting based on sensor data including at least one of compass data and radio signal strength.

21. The apparatus according to claim 14 further comprising one or more wireless sensors coupled wirelessly to the aggregator unit for providing wireless sensor data thereto; and wherein the aggregator unit inputs the wireless sensor data from the one or more wireless sensors and determines the gesture based upon the wireless sensor data and the pose data.

22. The apparatus according to claim 14 wherein the detection unit further includes a haptic feedback circuit for providing haptic feedback upon receipt of a context signal.

23. The apparatus according to claim 15 wherein the one or more sensors within each of the plurality of integrated mechanical assemblies include a plurality of sensors, the plurality of sensors including at least two of:
- a capacitive touch surface for detecting a capacitive touch;
- an accelerometer;
- a gyroscope; and
- a compass.

24. The apparatus according to claim 15 wherein the one or more sensors within each of the plurality of integrated mechanical assemblies include a plurality of sensors, the plurality of sensors including:
- a capacitive touch surface for detecting a capacitive touch;
- an accelerometer;
- a gyroscope; and
- a compass.

25. An apparatus capable of interacting with at least one controllable device based upon a pose of at least a portion of a human body disposed within a space, the apparatus comprising:
- a plurality of sensors that are sized for wearing on the human body, each of the one or more sensors emitting sensor data;
- a plurality of detection units that each inputs sensor data from a plurality of sensors associated therewith and aggregates the input sensor data into aggregated data;
- an aggregator unit that wirelessly inputs aggregated data from each of the plurality of detection units, the aggregator unit including:
  - an aggregator memory that stores at least one or more characteristics of human anatomy that are associated with the human body using at least a partial skeletal rendering of a human; and
  - an aggregator processor, automatically operating under software control, that further aggregates and fuses the aggregated data from each of the plurality of detection units using the at least one or more characteristics of human anatomy stored in the aggregator memory to determine the pose of at least the portion of the human body based upon a locality of said plurality of sensors,
- wherein there are a plurality of integrated mechanical assemblies sized for wearing on the portion of the human body whose pose is being determined, with each of the plurality of the integrated mechanical assemblies housing one or more sensors from the plurality of sensors and one of the plurality of detection units, each integrated mechanical assembly wirelessly outputting an associated plurality of poses as at least a portion of the aggregated data during the period of time wherein at least two of the integrated mechanical assemblies is each formed as a ring wearable on a human finger.

26. The apparatus according to claim 25 wherein the at least one or more characteristics of human anatomy that are associated with the human body that are stored in the aggregator memory include at least one of (a) a range of motion of human skeletal joints and (b) limitations in the speed human bones can move relative to each other.

27. The apparatus according to claim 25 wherein the at least one or more characteristics of human anatomy that are associated with the human body that are stored in the aggregator memory include (a) a range of motion of human skeletal joints and (b) limitations in the speed human bones can move relative to each other.

28. The apparatus according to claim 25 wherein the aggregator unit interacts with the at least one controllable device and wherein the aggregator processor directs a command signal based on the gesture to the at least one controllable device using a different communication protocol than used for communicating the pose data between the detection unit and the aggregation unit.

29. The apparatus according to claim 28 wherein the aggregator unit interacts with a plurality of controllable device and is associated with only one of the plurality of controllable devices during a given period and wherein the aggregator processor directs a command signal based on the gesture to a single one of the plurality of controllable devices during the given period using a different communication protocol than used for communicating the pose data between the detection unit and the aggregation unit.

30. The apparatus according to claim 25 wherein the association with the only one of the plurality of controllable devices during the given period is established based on the detecting unit detecting that a portion of the anatomy is pointing to the controllable device said detecting based on sensor data including at least one of compass data and radio signal strength.

31. The apparatus according to claim 25 wherein the at least one or more characteristics of human anatomy that are associated with the human body that are stored in the memory include at least one of (a) a range of motion of human skeletal joints and (b) limitations in the speed human bones can move relative to each other.

32. The apparatus according to claim 31 wherein the at least one or more characteristics of human anatomy that are associated with the human body that are stored in the memory include (a) a range of motion of human skeletal joints and (b) limitations in the speed human bones can move relative to each other.

33. The apparatus according to claim 25 further comprising:
- one or more wireless sensors coupled wirelessly to the aggregator unit for providing wireless sensor data thereto; and
- wherein the aggregator unit inputs the wireless sensor data from the one or more wireless sensors and determines the gesture based upon the wireless sensor data and the pose data.

34. The apparatus according to claim 25 wherein the detection unit further includes a haptic feedback circuit for providing haptic feedback upon receipt of a context signal.

35. The apparatus according to claim 25 wherein the one or more sensors include a plurality of sensors, the plurality of sensors including at least two of:
- a capacitive touch surface for detecting a capacitive touch;
- an accelerometer;
- a gyroscope; and
- a compass.

36. The apparatus according to claim 25 wherein the one or more sensors include a plurality of sensors, the plurality of sensors including:
- a capacitive touch surface for detecting a capacitive touch;
- an accelerometer;
- a gyroscope; and
- a compass.

37. The apparatus of claim 25, wherein each integrated mechanical assembly is configured to operate with its own relative coordinate system within a sub-space of the space and not based upon absolute coordinates of the space.

38. A method for interacting with at least one controllable device based upon a pose of at least a portion of a human body disposed within a space, the method comprising:
   sensing, using one or more sensors that are sized for wearing on the human body, sensor data from each of the one or more sensors; and
   determining the pose of at least the portion of the human body based upon the sensor data, under processor and software control, the step of determining operating to:
      associate at least one or more characteristics of human anatomy with the human body using at least a partial skeletal rendering of a human; and
      automatically determine, under the processor and software control, the pose of at least the portion of the human body based upon a locality of said one or more sensors, the step of automatically determining including inputting, aggregating and fusing the sensor data from each of the one or more sensors using the at least one or more characteristics of human anatomy to determine the pose, wherein the at least one or more characteristics of human anatomy that are associated with the human body that are stored in the memory include at least one of (a) a range of motion of human skeletal joints and (b) limitations in the speed human bones can move relative to each other,
   wherein at least some of the one or more sensors, the processor and the software are packaged in an integrated detection unit mechanical assembly,
   wherein there exists a plurality of the integrated detection unit mechanical assemblies that determine at least a portion of the pose, and
   wherein each of the plurality of the integrated detection unit mechanical assemblies is sized for wearing on the portion of the human body whose pose is being determined.

39. The method according to claim 38 wherein the step of determining operates upon the sensor data from the at least some of the one or more sensors in each of the plurality of the integrated detection unit mechanical assemblies using a relative coordinate system.

40. The method according to claim 38 wherein the at least one or more characteristics of human anatomy that are associated with the human body that are stored in the memory include (a) a range of motion of human skeletal joints and (b) limitations in the speed human bones can move relative to each other.

41. The method according to claim 38 further including the step of directing a command signal based on the pose to the at least one controllable device.

42. The method according to claim 38 wherein the step of determining further includes the step of determining the occurrence of a gesture based on a plurality of said poses determined over a period of time.

43. The method according to claim 41, wherein the step of determining further includes the step of directing a command signal based on the gesture to at least one of the plurality of controllable devices.

44. The method according to claim 38 wherein the step of determining further includes the step of wirelessly outputting a plurality of poses as pose data during a period of time; and further comprising the steps of:
   determining a gesture based upon the pose data using an aggregator processor and software control that inputs and operates upon the pose data using the at least one or more characteristics of human anatomy to determine the gesture.

45. The method according to claim 38, wherein the step of determining the gesture further includes the step of directing a command signal based on the gesture to at least one of the plurality of controllable devices using a different communication protocol than used for communicating the pose data.

46. The method of claim 38, wherein each of the plurality of the integrated detection unit mechanical assemblies is configured to operate with its own relative coordinate system within a sub-space of the space and not based upon absolute coordinates of the space.

* * * * *